United States Patent

[11] 3,629,824

[72] Inventor Douglas C. Bossen
Wappingers Falls, N.Y.
[21] Appl. No. 10,847
[22] Filed Feb. 12, 1970
[45] Patented Dec. 21, 1971
[73] Assignee International Business Machines Corporation
Armonk, N.Y.

[54] APPARATUS FOR MULTIPLE-ERROR CORRECTING CODES
7 Claims, 9 Drawing Figs.

[52] U.S. Cl. .......... 340/146.1
[51] Int. Cl. .......... G06f 11/12, G08c 25/00
[50] Field of Search .......... 340/146.1; 235/153

[56] References Cited

UNITED STATES PATENTS

| | | | |
|---|---|---|---|
| 3,418,630 | 12/1968 | Van Duuren | 340/146.1 |
| 3,458,860 | 7/1969 | Shimabukuro | 340/146.1 |
| 3,474,413 | 10/1969 | Dryden | 340/146.1 |

*Primary Examiner*—Charles E. Atkinson
*Attorneys*—Hanifin and Jancin and Harold H. Sweeney, Jr.

ABSTRACT: Apparatus including an encoder adapted for encoding blocks of data into a sent message and a decoder adapted for recovering the data from a received message corresponding to the sent message but which may be in error wherein the blocks of data consist of K-bytes of data ($D_1$, $D_2$,...$D_K$) each of $b$ bits. The sent message comprises the K-bytes of data plus two check bytes $C_1$ and $C_2$, each of $b$ bits. The decoder is effective in recovering the data without error when not more than a single byte of the received message is in error no matter how many bits may be in error in the single byte. The encoder computes the check bytes according to the relationships $$C_1 = ID_1 + ID_2 \dots + ID_K$$
$$C_2 = A_1D_1 + A_2D_2 \dots + A_KD_K$$

wherein $I$ is the identity element and $A_1, A_2, \dots A_K$ are distinct nonzero elements of Galois Field ($2^b$), wherein the indicated multiplication and addition are the Galois Field defined operations, and wherein $b$ is an integer > 1, and $K$ is an integer $2 < K < 2^b$.

APPARATUS FOR MULTIPLE-ERROR CORRECTING CODES

This invention relates to error-correcting codes.

A primary object of the invention is to effect error-free recovery of data. Other objects are to correct one or more errors within a single multiple-bit byte of data and to effect such recovery and correction with a low-redundancy code and a minimum of apparatus. For example, in a system where data is recorded by punching eight binary bits of data into individual cards (each considered as a byte), the invention will effect error-free recovery of the data from a block of cards when several bits of data from a single card are erroneously punched.

The invention features apparatus including an encoder adapted for encoding blocks of data into a sent message and a decoder adapted for recovering the data from a received message corresponding to the sent message but which may be in error, wherein the blocks of data consist of K-bytes of data ($D_1$, $D_2$,...$D_K$) each of $b$ bits, the sent message comprises the K-bytes of data plus two check bytes $C_1$ and $C_2$, each of $b$ bits, the decoder is effective in recovering the data without error when not more than a single byte of the received message is in error no matter how many bits may be in error in the single byte, and the encoder computes the check bytes according to the relationships $$C_1=ID_1+ID_2 \ldots +ID_K$$
$$C_2=A_1D_1+A_2D_2 \ldots +A_KD_K$$

wherein $I$ is the identity element and $A_1$, $A_2$,...$A_K$ are distinct nonzero elements of Galois Field ($2^b$), wherein the indicated multiplication and addition are the Galois Field defined operations, and wherein $b$ is an integer >1, and $K$ is an integer $2<K<2^b$.

Preferred embodiments feature means including a plurality of modulo-2 adder circuits for concurrent computation of syndrome bytes $S_1$ and $S_2$ according to the relationships $$S_1=TD_1'+TD_2'\ldots+TD_K'+TC_1'$$
$$S_2=A_1D_1'+A_2D_2'\ldots+A_KD_K'+IC_2'$$

(wherein a primed symbol indicates a byte of the received message corresponding to the unprimed symbol in the sent message), means including a plurality of adder circuits and an OR circuit for calculating correction criteria according to the relationship $B_j=A_jS_1+IS_2$, the condition $B_j=O$ indicating correction in the $j^{th}$ byte of the received message, and means for correcting any byte of the received message including for each bit of received data $d_{j,p}'$ (designating the $p^{th}$ bit of the $j^{th}$ byte) three AND circuits, the first having as inputs $d_{j,p}'$ and $\widehat{S}_{1,p}$ (designating the negative of the $p^{th}$ bit of the $j^{th}$ syndrome byte), the second having as inputs $d_{j,p}'$ and $B_j$ (designating the correction criterion of the $j^{th}$ byte), and the third having as inputs $\overline{B}_j$, $\overline{d}_{j,p}'$, and $S_{l,p}'$, by which means $S_1$ is added to the $j^{th}$ byte of the received message when the $j^{th}$ criterion indicates a correction.

Other objects, features, and advantages will appear from the following description of a preferred embodiment of the invention taken together with the attached drawings thereof, in which FIG. 1 shows a block diagram of a data handling system using the invention;

Figure 1:
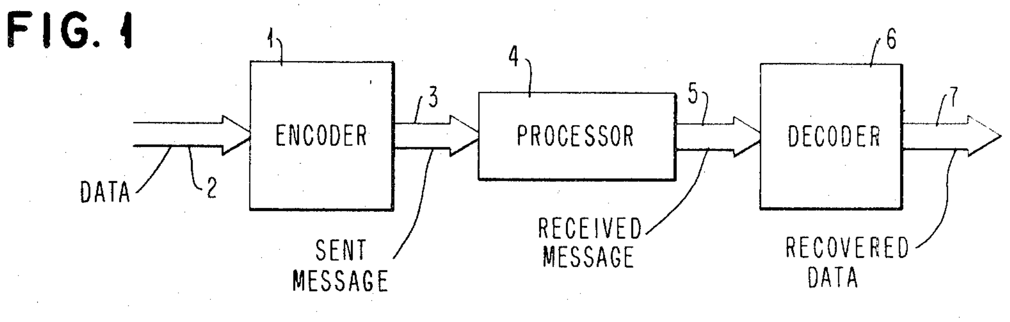

Referring to FIG. 1, data enters an encoder 1 through a channel 2. Encoder 1 generates a sent message which passes through channel 3 to a processor 4 which performs some operation on the message, for example, storing it and subsequently reactivating it, and then transcribes a received message which passes through channel 5 to decoder 6 which decodes the received message and emits recovered data, which passes through channel 7 to some further use. The operation of processor 4 may be imperfect and make occasional errors so that the received message in channel 5 is not necessarily identical with the sent message in channel 3. The encoder 1 and decoder 6 cooperate to emit recovered data at channel 7 having fewer errors than are made by the processor.

It will be appreciated by those skilled in the art that this invention can be applied to information-handling systems of various capacities. The invention will, therefore, be first described in algebraic terms which are applicable to any size system and subsequently in terms of a specific system.

According to the invention, data is processed by the system in blocks consisting of K-bytes, each byte having $b$ bits of data. (Here and throughout, $b$ designates an integer >1 and $K$ an integer $2<K<<2^b$. The values of $b$ and $K$ are to be considered invariant for a particular embodiment, but are variously chosen for embodiments of various capacities.) A block of data will accordingly be designated $D_1$, $D_2$,...$D_K$ wherein $D_1$ represents the first byte in the block, $D_2$ the second byte, and so on to $D_K$ which represents $K^{th}$ and last byte. A representative byte of data will be designated $D_j$ with the subscript $j$ assuming any integral value $1\leq j\leq K$. According to the invention, the encoder calculates from the block of data two check bytes, (designated $C_1$ and $C_2$) each of $b$ bits and appends the check bytes of the $K$ data bytes to generate the sent message of $K$+2 bytes.

In order to describe the calculation of the check bytes it is convenient to note that for bytes composed of $b$ binary bits there are $2^b$ distinct bytes possible and to regard each possible byte as an element of a Galois Field of $2^b$ elements (or GF($2^b$)). The existence of GF($2^b$) is assured for any value of $b$ by general theorems of algebra. (See for example W. Wesley Peterson: Error Correcting Codes; M.I.T. Press (1961)). The Galois Field implies two operations conventionally designated "addition" with the corresponding zero element $\theta$, and "multiplication" with corresponding identity element I. The terms "addition" and "multiplication" and related terms such as "adder" will be used in this sense throughout.

The rules of addition and multiplication of bytes are established by recognizing that the GF ($2^b$) of possible bytes is isomorphic with the GF($2^b$) of polynomials with coefficients in GF(2) taken modulo an irreducible polynomial of degree $b$. (At least one irreducible polynomial exists for any $b$.) The field of such polynomials is a vector space of dimension $b$ over GF(2). Addition of the elements in GF($2^b$) is therefore accomplished by addition of corresponding bits. (Addition is of course in GF(2) and thus equivalent to addition modulo 2.) Multiplication in GF($2^b$) can be thought of as defining a set of linear transformations in the corresponding vector space of dimension $b$.

The vector space is spanned by the column vectors:

$$\begin{pmatrix}1\\0\\0\\0\\ \cdot\\ \cdot\\ \cdot\\0\end{pmatrix},\begin{pmatrix}0\\1\\0\\0\\ \cdot\\ \cdot\\ \cdot\\0\end{pmatrix},\begin{pmatrix}0\\0\\1\\0\\ \cdot\\ \cdot\\ \cdot\\0\end{pmatrix},\ldots\begin{pmatrix}0\\0\\0\\0\\ \cdot\\ \cdot\\ \cdot\\1\end{pmatrix} \qquad (1)$$

(wherein the 0 and 1 are binary symbols), or more compactly expressed:

$$a^{b-1}, a^{b-2}\ldots a, I$$

where $a$ is a primitive element of GF($2^b$). (i.e., every nonzero element of the field can be obtained by raising $a$ to some power.) The transformation matrix corresponding to multiplication by element Q is given by catenation of the column vectors $$Qa^{b-1}, Qa^{b-2}\ldots Qa, QI \qquad (2)$$

giving $$[T_Q=Qa^{b-1}\ Qa^{b-2}\ldots Qa\ QI] \qquad (3)$$

Multiplication of the element R by the element $Q$ in GF($2^b$) is thus equivalent to multiplication of the vector R by the matrix $T_Q$ where the vector and matrix components are in GF(2). (i.e., binary bits). These operations will be illustrated below in connection with a preferred embodiment.

Returning now to the data handling system, according to the invention, the encoder calculates the check bytes according to the relationships $$C_1 = ID_1 + TD_2 \ldots + ID_K \quad (4)$$

$$C_2 = A_1D_1 + A_2D_2 \ldots + A_KD_K \quad (5)$$

where $A_1$, $A_2 \ldots A_K$ are distinct, nonzero elements, of GF($2^b$). Since there are $2^b-1$ such elements, the number of bytes in a block is limited to $K<2^b$. It is convenient to express the relationships by which $C_1$ and $C_2$ are computed by an encoding matrix giving the coefficients $$H_E = \begin{bmatrix} I & I & \ldots & I \\ A_1 & A_2 & \ldots & A_K \end{bmatrix} \quad (6)$$

and the encoding calculation can be written symbolically $$C = H_E D \quad (7)$$

Employing the relationships developed above, the encoding matrix can be expressed in binary form by replacing each element of GF($2^b$) appearing in the encoding matrix by the corresponding binary multiplication matrix. The resulting form of the encoding matrix will give explicitly the operations to be performed by a binary-based computer to calculate the check bytes.

Turning now to the decoding, the decoder 6 receives a received message $D_1'$, $D_2' \ldots D_K'$, $C_1'$, $C_2'$ of $K+2$ bytes and computes a two-byte syndrome ($S_1$, $S_2$) according to the relationships $$S_1 = TD_1' + ID_2' \ldots + ID_K' + IC_1' \quad (8)$$

$$S_2 = A_2D_2' + A_2D_2' \ldots + A_KD_K' + IC_2' \quad (9)$$

described by a decoding matrix with $K+2$ columns and 2 rows:

$$H_D = \begin{matrix} I & I & \ldots & I & I & \theta \\ A_1 & A_2 & \ldots & A_K & \theta & I \end{matrix} \quad (10)$$

where $\theta$ is the zero element in GF($2^b$). The calculation of the syndrome can be indicated symbolically $$S_{H_D}(D', C') \quad (11)$$

The decoding matrix $H_D$ can of course be expressed explicitly in binary form by substituting the binary multiplication matrices.

The significance of the syndrome ($S_1$, $S_2$) can be understood from consideration of the following operations which can be readily derived from the encoding and decoding relationships on the supposition that at least all but one byte has been correctly transcribed. If $S_1=\theta$, $S_2=\theta$, there is no error in the received message. If $S_1=\theta$, $S_2\neq\theta$, there is an error in $C_2'$. If $S_1\neq\theta$, $S_2=\theta$, there is an error in $C_1'$. If $S_2=A_jS_1\neq\theta$, there is an error of $S_1$ in $D_2'$.

The decoder generates for every byte a criterion from the equation $$B_j = A_jS_1 + IS_2 \quad (12)$$

and generates the recovered data $D_j''$ according to $$D_j'' = D_j' \quad (B_j \neq \theta) \quad (13)$$

$$D_j'' = D_j' + S_1 \quad (B_j = 0) \quad (14)$$

In particular it should be recognized that the byte in error is corrected even if multiple bits within the byte are in error.

Figure 2:
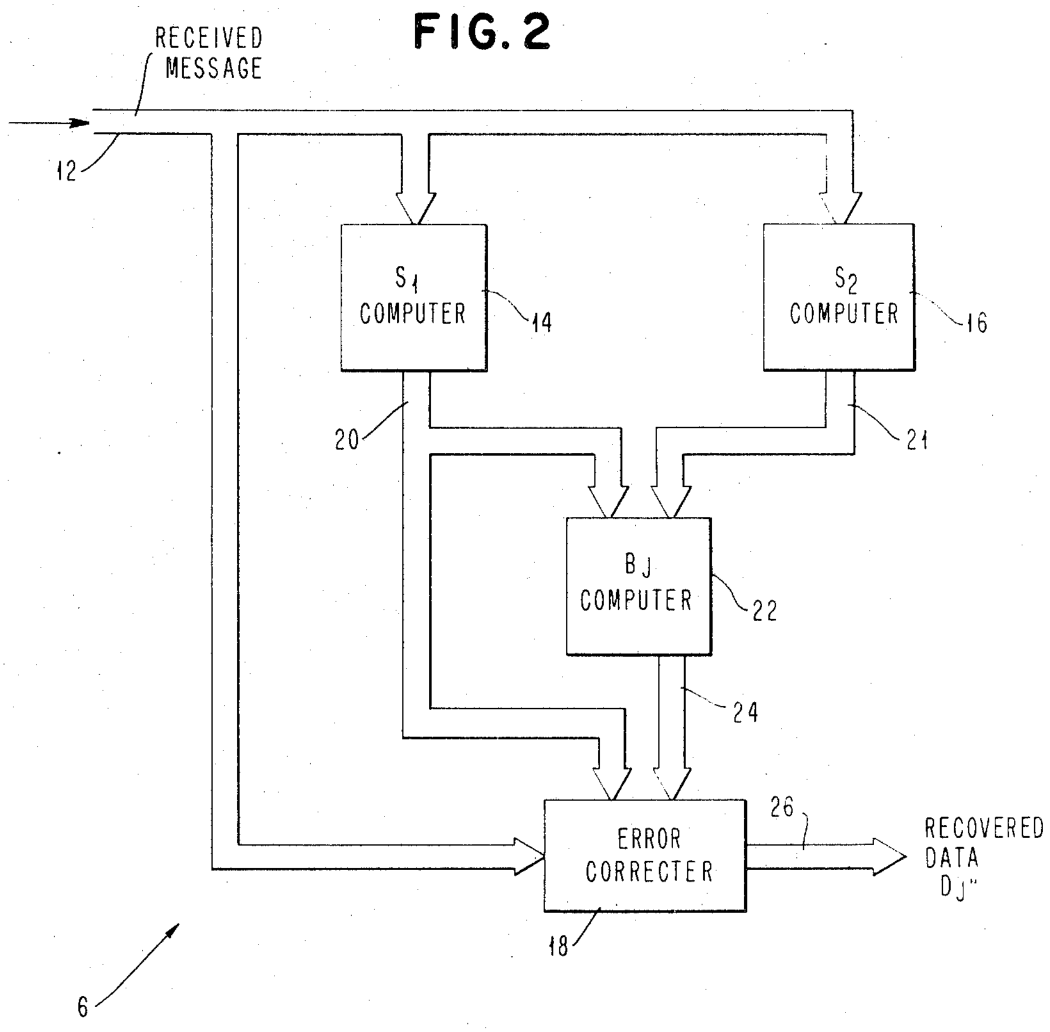
FIG. 2 shows a block diagram of the decoder according to the invention.

Referring now to FIG. 2 showing a block diagram of a preferred embodiment handling a data block of 64 bits in 8 bytes, each of 8 bits, the received message enters decoder 6 at 12 and passes in parallel channels to first syndrome component computer 14, second syndrome component computer 16, and error corrector 18. Computer 14 computes and emits at 20 syndrome component $S_1$, which passes by parallel channels to error corrector 18 and criteria computer 22. Computer 16 computes and emits at 21 syndrome component $S_2$, which passes to criteria computer 22. Criteria computer 22 calculates criteria $B_j$ for every $D_j'$ and emits the criteria at 24 where they pass to error corrector 18. Error corrector 18 calculates the recovered data $D_j''$ and emits them at 26.

Figure 3:
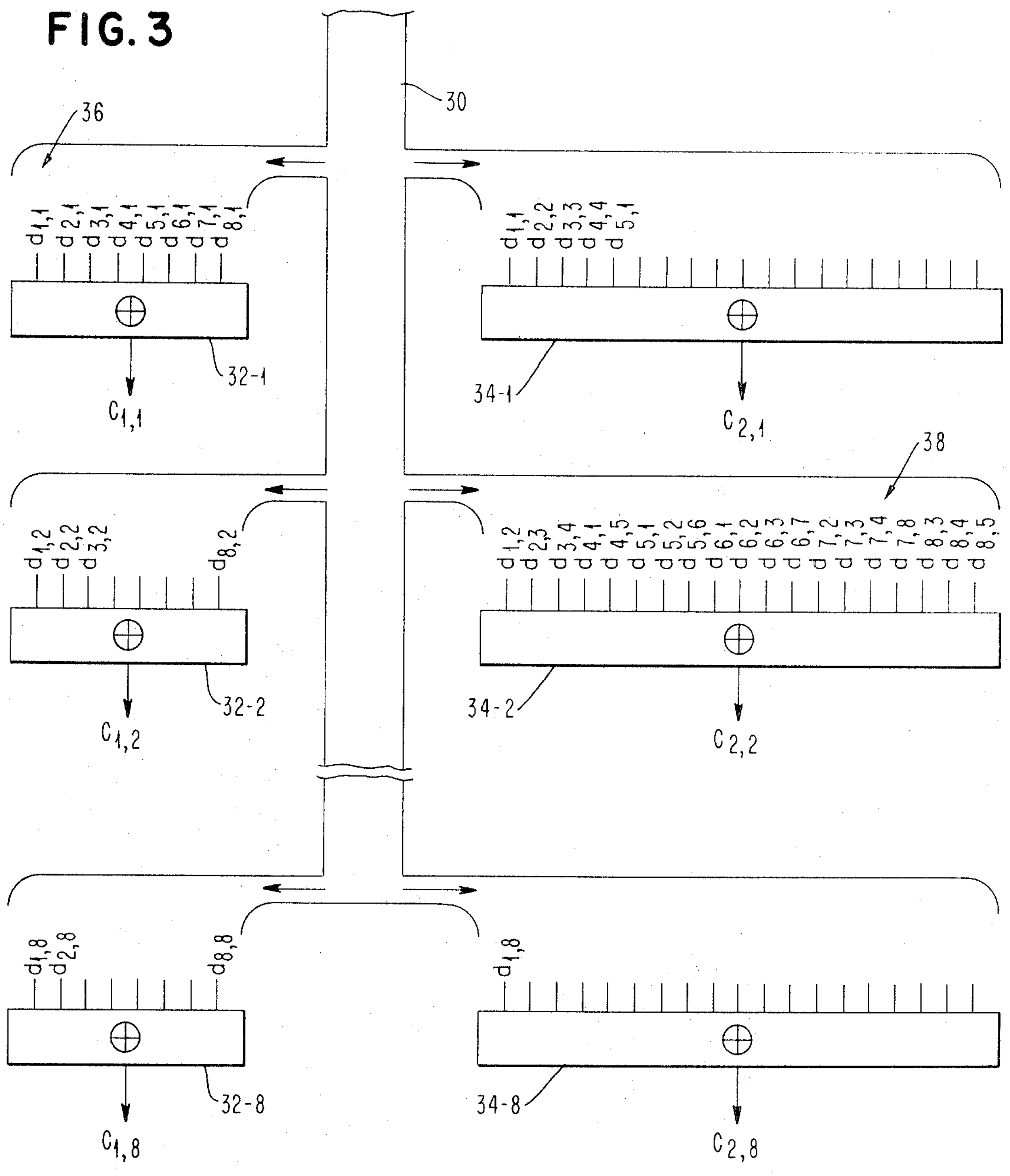
FIG. 3 shows the organization of the encoder according to the invention.

FIG. 3 shows the organization of the encoder. The data enters at 30 and is fanned out to eight adders 32-1 to 32-8 calculating $C_1$ and eight adders 34-1 to 34-8 calculating $C_2$. The output of each adder is the sum of its inputs, the addition being defined in GF(2). In FIG. 3 the data is shown in binary form as it is processed by a binary-based machine, $d_{j,p}$ representing the $p^{th}$ bit of the $j^{th}$ byte.

The fanning scheme is according to the general principles described above. For the preferred embodiment, the eight-column vectors from GF(2) are chosen as $$I=\begin{pmatrix}0\\0\\0\\0\\0\\0\\0\\1\end{pmatrix},\ a^1=\begin{pmatrix}0\\0\\0\\0\\0\\0\\1\\0\end{pmatrix},\ a^2=\begin{pmatrix}0\\0\\0\\0\\0\\1\\0\\0\end{pmatrix},\ a^3=\begin{pmatrix}0\\0\\0\\0\\1\\0\\0\\0\end{pmatrix}$$

$$a^4=\begin{pmatrix}0\\0\\0\\1\\0\\0\\0\\0\end{pmatrix},\ a^5=\begin{pmatrix}0\\0\\1\\0\\0\\0\\0\\0\end{pmatrix},\ a^6=\begin{pmatrix}0\\1\\0\\0\\0\\0\\0\\0\end{pmatrix},\ a^7=\begin{pmatrix}1\\0\\0\\0\\0\\0\\0\\0\end{pmatrix} \quad (15)$$

and the multiplication matrices are based on the irreducible polynomial $X^8+X^4+X^3+X^2+1$, giving $$T_1=\begin{bmatrix}1&0&0&0&0&0&0&0\\0&1&0&0&0&0&0&0\\0&0&1&0&0&0&0&0\\0&0&0&1&0&0&0&0\\0&0&0&0&1&0&0&0\\0&0&0&0&0&1&0&0\\0&0&0&0&0&0&1&0\\0&0&0&0&0&0&0&1\end{bmatrix} \quad (16)$$

$$T_{a'}=\begin{bmatrix}0&1&0&0&0&0&0&0\\0&0&1&0&0&0&0&0\\0&0&0&1&0&0&0&0\\1&0&0&0&1&0&0&0\\1&0&0&0&0&1&0&0\\1&0&0&0&0&0&1&0\\0&0&0&0&0&0&0&1\\1&0&0&0&0&0&0&0\end{bmatrix}$$

$$T_{a^2}=\begin{bmatrix}0&0&1&0&0&0&0&0\\0&0&0&1&0&0&0&0\\1&0&0&0&1&0&0&0\\1&1&0&0&0&1&0&0\\1&1&0&0&0&0&1&0\\0&1&0&0&0&0&0&1\\1&0&0&0&0&0&0&0\\0&1&0&0&0&0&0&0\end{bmatrix}$$

$$T_{a^3}=\begin{bmatrix}0&0&0&1&0&0&0&0\\1&0&0&0&1&0&0&0\\1&1&0&0&0&1&0&0\\1&1&1&0&0&0&1&0\\0&1&1&0&0&0&0&1\\1&0&1&0&0&0&0&0\\0&1&0&0&0&0&0&0\\0&0&1&0&0&0&0&0\end{bmatrix}$$

$$T_{a^4}=\begin{bmatrix}1&0&0&0&1&0&0&0\\1&1&0&0&0&1&0&0\\1&1&1&0&0&0&1&0\\0&1&1&1&0&0&0&1\\1&0&1&1&0&0&0&0\\0&1&0&1&0&0&0&0\\0&0&1&0&0&0&0&0\\0&0&0&1&0&0&0&0\end{bmatrix}$$

$$T_{a^5}=\begin{bmatrix}1&1&0&0&0&1&0&0\\1&1&1&0&0&0&1&0\\0&1&1&1&0&0&0&1\\0&0&1&1&1&0&0&0\\1&1&0&1&1&0&0&0\\1&0&1&0&1&0&0&0\\0&0&0&1&0&0&0&0\\1&0&0&0&1&0&0&0\end{bmatrix}$$

$$T_{a^6}=\begin{bmatrix}1&1&1&0&0&0&1&0\\0&1&1&1&0&0&0&1\\0&0&1&1&1&0&0&0\\0&0&0&1&1&1&0&0\\0&1&1&0&1&1&0&0\\1&1&0&1&0&1&0&0\\1&0&0&0&1&0&0&0\\1&1&0&0&0&1&0&0\end{bmatrix}$$

$$T_{a^7}=\begin{bmatrix}0&1&1&1&0&0&0&1\\0&0&1&1&1&0&0&0\\0&0&0&1&1&1&0&0\\1&0&0&0&1&1&1&0\\0&0&1&1&0&1&1&0\\0&1&1&0&1&0&1&0\\1&1&0&0&0&1&0&0\\1&1&1&0&0&0&1&0\end{bmatrix}$$

$$T_{\theta}=\begin{bmatrix}0&0&0&0&0&0&0&0\\0&0&0&0&0&0&0&0\\0&0&0&0&0&0&0&0\\0&0&0&0&0&0&0&0\\0&0&0&0&0&0&0&0\\0&0&0&0&0&0&0&0\\0&0&0&0&0&0&0&0\\0&0&0&0&0&0&0&0\end{bmatrix}$$

Figure 7:
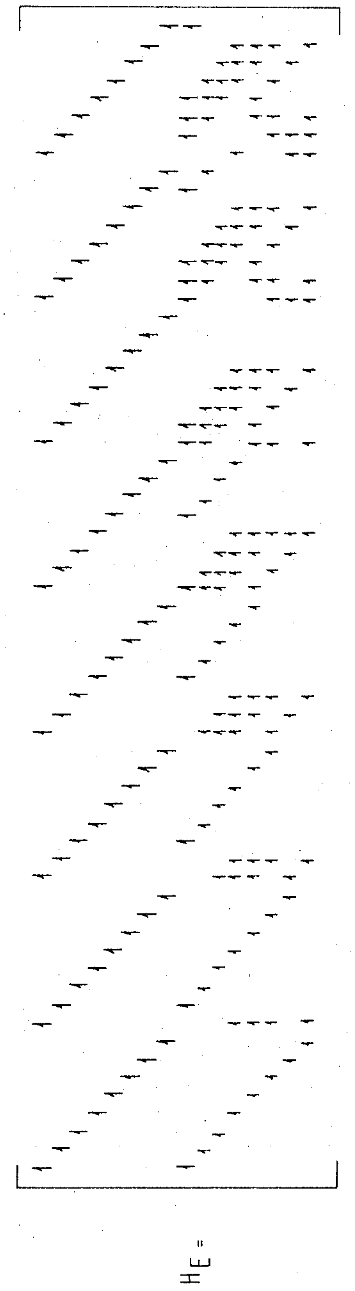
FIG. 7 shows the encoding matrix.

The resulting encoding matrix is shown in binary form in FIG. 7.

The bit inputs 36 to adder 32–1 which calculates the first bit of check byte $C_1$ are shown in full in FIG. 3. These inputs correspond to the first row of $H_E$. Similarly the inputs 38 to adder 34–2 calculating the $2^{nd}$ bit of the $2^{nd}$ check byte are shown. These correspond to the $10^{th}$ row of $H_E$. The other inputs not shown in detail can be obtained by reference to $H_E$.

Figure 4:
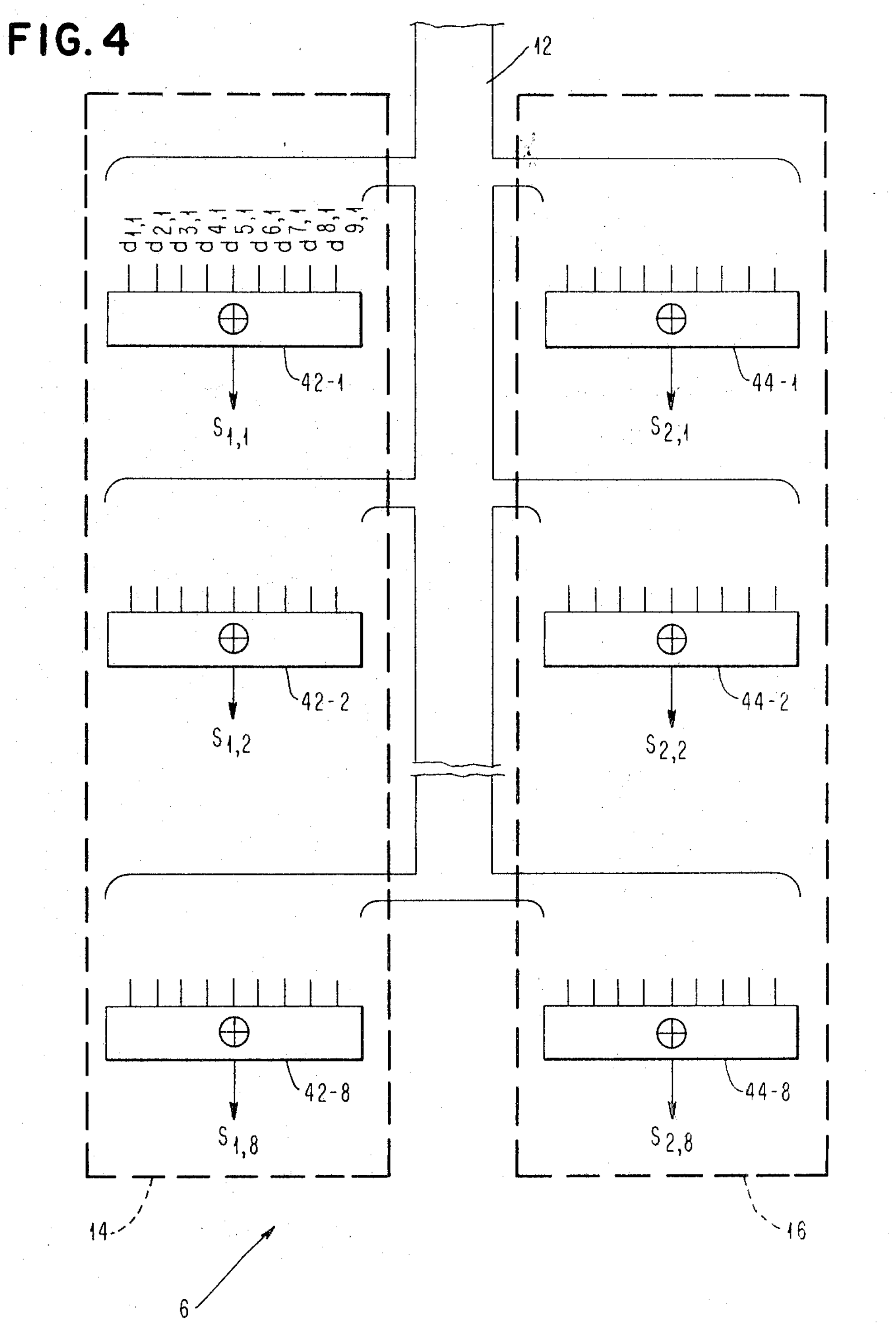
FIG. 4 shows the organization of the syndrome computer.
Figure 5A:
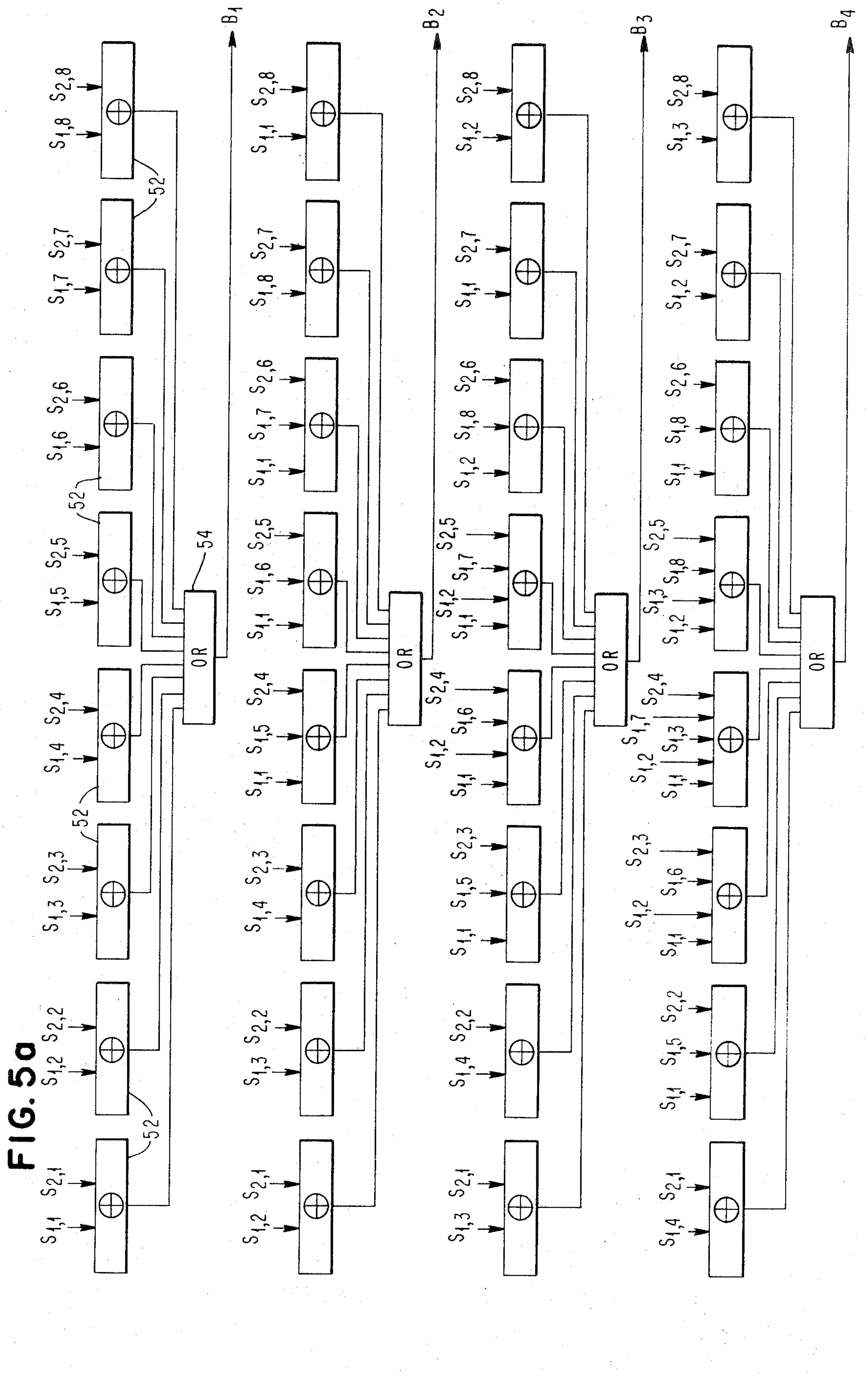
FIGS. 5a and 5b show the organization of the criteria computer.
Figure 5B:
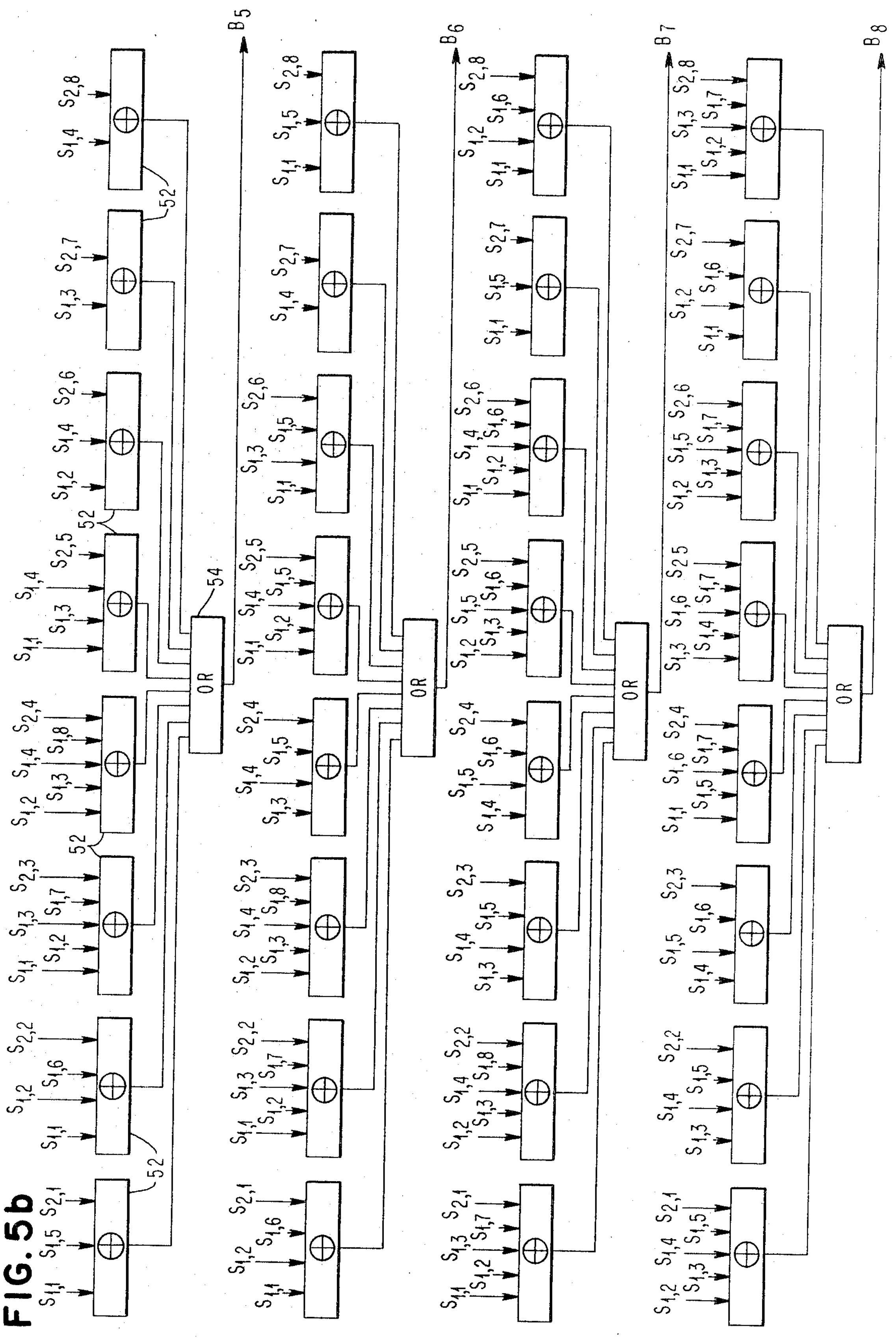
Figure 8:
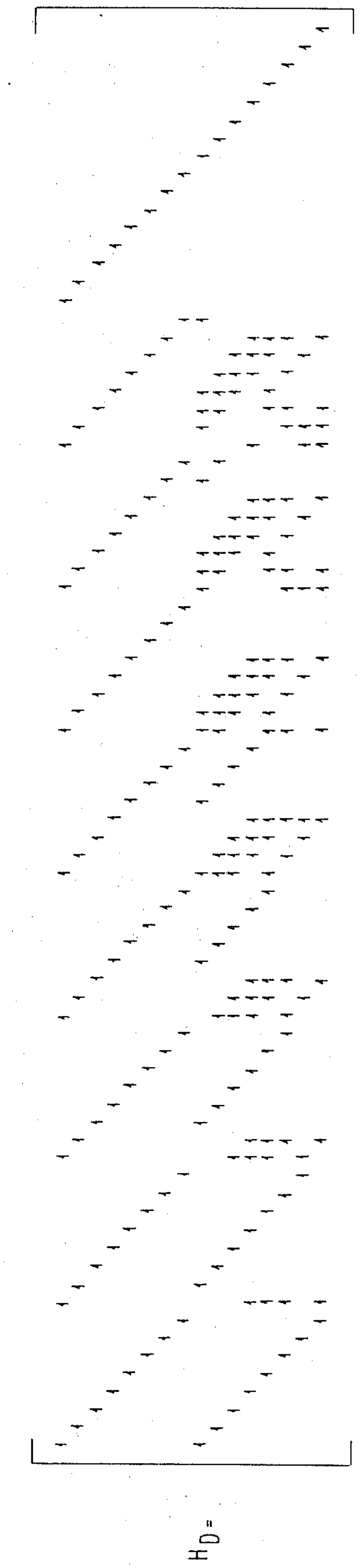
FIG. 8 shows the decoding matrix.

FIG. 4 shows the organization of syndrome computers 14, 16 of decoder 6. The received message enters at 12 and fans out to the adders 42–1 to 42–8 which calculate the bits of the first syndrome component $S_1$ and to the adders 44–1 to 44–8 calculating the bits of the second component $S_2$ in accordance with the decoding matrix expressed in binary form as shown in FIG. 8. The individual inputs are shown for adder 42–1 and the input for others (not shown in detail in FIG. 4) can be obtained from $H_D$. The top eight rows of $H_D$ are used to compute $S_1$ and the bottom eight to compute $S_2$.

The organization of the criteria computer is shown in FIGS. *5a* and *5b*. Syndrome bits (the third bit of the second syndrome component is designated $S_{2,3}$ for example) are fed into eight adders 52 according to equation (12). The output of the eight adders is fed to OR-circuit 54 which produces output $B_1$. Outputs $B_2$, $B_3$...$B_8$ are obtained from similar circuitry. The syndrome bits fed to each adder are indicated in FIGS. *5a* and *5b*.

Figure 6:
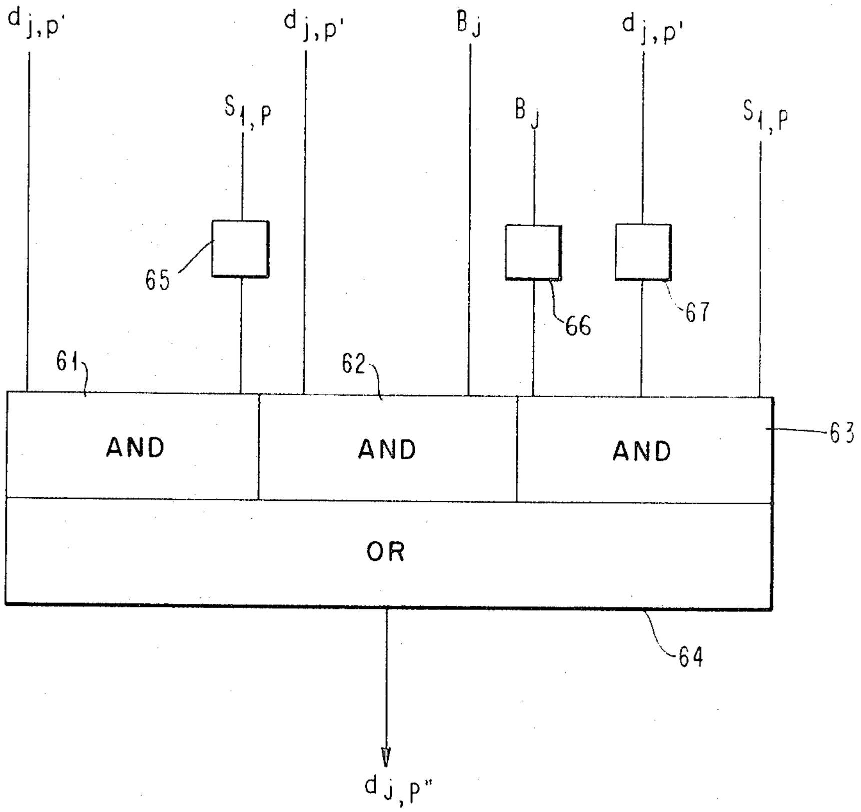
FIG. 6 shows the organization of the correction computer.

A typical portion or error corrector 18 is shown in FIG. 6, viz: the circuits which process the $p^{th}$ bit of the $j^{th}$ byte. Three AND-circuits 61, 62, 63 are used in parallel feeding into OR-circuit 64. Three inverters 65, 66, 67 are included. AND-circuit 61 has as inputs the received data bit $\bar{d}_{j,p}'$ and the syndrome bit $\bar{S}_{1,p}$ (where the bar indicates an inverted signal); AND-circuit 62 has as inputs the received data bit $d_{j,p}'$ and one of the correction criteria $B_j$; AND-circuit 63 has as inputs the correction criterion inverted $\bar{B}_j$, the received data bit inverted $d_{j,p}'$, and the syndrome bit $S_{1,p}$. OR-circuit 64 generates the recovered data bit $d_{j,p}''$. An identical group of circuits is provided for each data bit, so that in all there are in general $b$ times K groups (a total of 64 in the preferred embodiment) of circuits as here described in error corrector 18.

What is claimed is:

1. Apparatus including an encoder adapted for encoding blocks of data into a sent message and a decoder adapted for recovering said data from a received message corresponding to said sent message but which may be in error, wherein said blocks of data consist of K-bytes of data ($D_1$, $D_2$...$D_K$) each of $b$ bits, said sent message comprises said K-bytes of data plus two check bytes $C_1$ and $C_2$, each of $b$ bits, said decoder is effective in recovering said data without error when not more than a single byte of said received message is in error no matter how many bits may be in error in said single byte, means in said encoder for computing said check bytes according to the relationships $$C_1=ID_1+ID_2...+ID_K$$
$$C_2=A_1D_1+A_2D_2...+A_KD_K$$

wherein $I$ is the identity element and $A_1$, $A_2$...$A_K$ are distinct nonzero elements of Galois Field ($2^b$), wherein the indicated multiplication and addition are the Galois Field defined operations, and wherein $b$ is an integer $>1$, and $K$ is an integer $2<K<2^b$.

2. The apparatus of claim 1 including means in said decoder for computing two syndrome bytes $S_1$ and $S_2$ each of $b$ bits according to the relationships:

$$S_1=ID_1'+ID_2'...+ID_K'+IC_1'$$
$$S_2=A_1D_1'+A_2D_2'...+A_KD_K'+IC_2'$$

wherein a primed symbol indicates a byte of said received message corresponding to unprimed symbol in said sent message.

3. The apparatus of claim 2 including means in said decoder for generating correction criteria in response to syndrome bytes $S_1$ and $S_2$ according to the relationship $B_j=A_jS_1+IS_2$, the condition $B_j=0$ indicating a correction on the $j^{th}$ byte of said received message.

4. The apparatus of claim 3 including means in said decoder for correcting any byte of said received message by adding syndrome $S_1$ to the $j^{th}$ byte of said received message when the $j^{th}$ said correction criterion indicates a correction.

5. The apparatus of claim 2 in which said means for computation of said syndrome bytes $S_1$ and $S_2$ includes a plurality of adder circuits whereby all bits of both syndrome bytes $S_1$ and $S_2$ are concurrently computed.

6. The apparatus of claim 3 in which said means in said decoder for generating each said correction criterion $B_j$ includes a plurality of adder circuits for receiving said syndrome bytes $S_1$ and $S_2$ and adding them modulo 2 in accordance with the modulo 2 additions indicated by said equation $B_j=A_j S_1+IS_2$ and an OR circuit having an input connection to the output of each of said adder circuits in accordance with the OR operation indicated by said equation, the output of said OR circuit providing said correction criterion $B_j$.

7. The apparatus of claim 4 in which said means for correcting any byte of said received message includes for each bit of received data $d_{j,p}'$ (designating the $p^{th}$ bit of the $j^{th}$ byte) three AND circuits, the first of said AND circuits having as inputs $d_{j,p}'$ and $S_{1,p}$ (designating the negative of the $p^{th}$ bit of the first syndrome byte), the second of said AND circuits having as inputs $d_{j,p}'$ and the $j^{th}$ correction criterion $B_j$, and the third of said AND circuits having as inputs $B_j'$, $d_{j,p}'$ and $S_{1,p}$.

* * * * *

PO-1050
(5/69)

UNITED STATES PATENT OFFICE
CERTIFICATE OF CORRECTION

Patent No. 3,629,824 Dated December 21, 1971

Inventor(s) Douglas C. Bossen

It is certified that error appears in the above-identified patent and that said Letters Patent are hereby corrected as shown below:

Column 6, line 61, after the word "and", the formula "$S_{1,p}$" should read --$\bar{S}_{1,p}$--. Column 6, line 65, after the word "inputs", "$B_j'$" should read --$\bar{B}_j'$-- and "$d_{j,p}'$" should read --$\bar{d}_{j,p}'$--.

Signed and sealed this 23rd day of May 1972.

(SEAL)
Attest:

EDWARD M.FLETCHER,JR.
Attesting Officer

ROBERT GOTTSCHALK
Commissioner of Patents 623-2721-0